United States Patent
Nakai et al.

(10) Patent No.: US 8,610,408 B2
(45) Date of Patent: Dec. 17, 2013

(54) LITHIUM ION SECONDARY BATTERY CHARGING METHOD AND BATTERY PACK

(75) Inventors: Haruya Nakai, Osaka (JP); Ryouichi Tanaka, Osaka (JP); Akira Nagasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 330 days.

(21) Appl. No.: 13/254,410

(22) PCT Filed: Nov. 26, 2010

(86) PCT No.: PCT/JP2010/006905
§ 371 (c)(1),
(2), (4) Date: Sep. 1, 2011

(87) PCT Pub. No.: WO2011/065009
PCT Pub. Date: Jun. 3, 2011

(65) Prior Publication Data
US 2011/0316487 A1    Dec. 29, 2011

(30) Foreign Application Priority Data
Nov. 27, 2009  (JP) ................ 2009-269744

(51) Int. Cl.
*H01M 10/44* (2006.01)
*H01M 10/46* (2006.01)

(52) U.S. Cl.
USPC ........................................... 320/160

(58) Field of Classification Search
USPC ............... 320/107, 112, 128, 137, 160, 162
See application file for complete search history.

(56) References Cited

U.S. PATENT DOCUMENTS

| | | | |
|---|---|---|---|
| 6,087,810 A | 7/2000 | Yoshida | |
| 7,248,021 B2 * | 7/2007 | Kozu et al. | 320/147 |
| 7,649,340 B2 * | 1/2010 | Sato et al. | 320/134 |
| 2005/0151514 A1 * | 7/2005 | Kozu et al. | 320/147 |
| 2006/0275657 A1 | 12/2006 | Kozuki et al. | |
| 2007/0178376 A1 | 8/2007 | Fujikawa et al. | |
| 2008/0067972 A1 | 3/2008 | Takami et al. | |
| 2010/0102778 A1 | 4/2010 | Otsu et al. | |

FOREIGN PATENT DOCUMENTS

| | | |
|---|---|---|
| JP | 09-017416 | 1/1997 |
| JP | 09-121462 | 5/1997 |
| JP | 10-145979 | 5/1998 |
| JP | 10-269916 | 10/1998 |

(Continued)

*Primary Examiner* — Edward Tso
(74) *Attorney, Agent, or Firm* — McDermott Will & Emery LLP

(57) ABSTRACT

A lithium ion secondary battery which includes: a power generation element including a positive electrode, a negative electrode, a separator interposed between the positive electrode and the negative electrode, and a non-aqueous electrolyte; a case accommodating the power generation element and having an opening; and a sealing plate sealing the opening of the case is charged. The sealing plate has an external terminal of the positive or negative electrode, and an internal terminal electrically connected to the positive or negative electrode. The external and internal terminals are connected to each other and have an electrical resistance therebetween of 0.1 to 2 mΩ. Two or more constant-current charging steps in each of which the secondary battery is charged at a constant charge current until a charge voltage reaches an end-of-charge voltage are performed. In the two or more constant-current charging steps, the secondary battery is subjected to constant-current charging at a current $Ic(1)$ of 1 to 5 C until the charge voltage reaches a target voltage $Ecs(1)$. After the charge voltage reached the target voltage $Ecs(1)$, the secondary battery is subjected to constant-current charging at a current $Ic(k)$ satisfying $Ic(k)<Ic(1)$ until the charge voltage reaches a target voltage $Ecs(k)$ higher than the target voltage $Ecs(1)$.

10 Claims, 5 Drawing Sheets

(56) References Cited

FOREIGN PATENT DOCUMENTS

| JP | 11-271408 | 10/1999 |
| JP | 2003-007349 | 1/2003 |
| JP | 2003-109672 | 4/2003 |
| JP | 2005-151643 | 6/2005 |
| JP | 2006-351512 | 12/2006 |
| JP | 2007-213819 | 8/2007 |
| JP | 2007-227361 | 9/2007 |
| JP | 2008-098149 | 4/2008 |
| JP | 2008-206259 | 9/2008 |

* cited by examiner

| Range of Nc | Correction value |
|---|---|
| Nc1~Nc2 | ΔI1 |
| Nc2~Nc3 | ΔI2 |
| Nc3~Nc4 | ΔI3 |
| ... | ... |

LITHIUM ION SECONDARY BATTERY CHARGING METHOD AND BATTERY PACK

RELATED APPLICATIONS

This application is the U.S. National Phase under 35 U.S.C. §371 of International Application No. PCT/JP2010/006905, filed on Nov. 26, 2010, which in turn claims the benefit of Japanese Application No. 2009-269744, filed on Nov. 27, 2009, the disclosures of which Applications are incorporated by reference herein.

TECHNICAL FIELD

The present invention relates to a technique for shortening the charging time of a lithium ion secondary battery while suppressing deterioration thereof.

BACKGROUND ART

Conventionally, lithium ion secondary batteries with high voltage and high energy density have been widely used as a power source for electronic equipment, such as notebook personal computers, cellular phones and audiovisual devices, electric powered tools, and the like. Lithium ion secondary batteries typically use a carbon material capable of absorbing and desorbing lithium as a negative electrode active material. As a positive electrode active material, a lithium-containing composite oxide (e.g., $LiCoO_2$) is typically used.

In recent years, as electronic equipment has been reduced in size and improved in performance, there is an increasing need for lithium ion secondary batteries to have higher capacity and longer life. In addition, as the frequency of use of electronic equipment increases in association with the development of ubiquitous network society, there is a strong need for shortening the charging time.

Conventionally, lowering the charge current has been proposed in order to improve the cycle characteristics of secondary batteries. At present, an active material with higher density is used in secondary batteries in order to improve the capacities thereof. If the charge current for such secondary batteries is raised, the acceptance of lithium ions tends to deteriorate, and as a result, the life of the secondary batteries is shortened. Therefore, lowering the charge current to be equal to or less than a predetermined value is effective in improving the cycle characteristics of secondary batteries. However, lowering the charge current in turn decreases the quantity of electricity that can be stored in a secondary battery per unit hour, which prolongs the charging time as a natural result. With regard to the charging time of secondary batteries, shortening the charging time is needed in various fields, and merely lowering the charge current cannot meet the needs.

Under these circumstances, in order to shorten the charging time without sacrificing the charge/discharge cycle life characteristics of secondary batteries (hereinafter simply referred to as "cycle characteristics"), various charge/discharge methods have been proposed. For example, Patent Literature 1 proposes that a secondary battery be charged at a comparative large current initially, and every time when the battery voltage reaches a predetermined cut-off voltage, the charge current be switched to a lower current and, simultaneously, the cut-off voltage be set to a lower voltage.

Patent Literature 2 proposes that constant-current and constant-voltage charging be performed until the battery voltage reaches a predetermined voltage (4.15 V) close to the rated voltage (4.2 V) of a secondary battery, followed by constant-current and constant-voltage charging at a comparatively small current of 0.2 to 0.5 C. Here, 1 C is a current at which the quantity of electricity corresponding to the nominal capacity of a secondary battery can be charged in one hour. Specifically, 0.2 C is one fifth of 1 C, and 0.5 C is one half of 1 C.

Patent Literature 3 proposes that, in a power source system comprising two sets of assembled battery, one of the assembled battery be configured by using a negative electrode having a lithium intercalation potential which is high and be charged and discharged to a depth of charge of 20 to 80%, thereby to make rapid charging possible.

Citation List

Patent Literature

[PTL 1] Japanese Laid-Open Patent Publication No. Hei 10-145979
[PTL 2] Japanese Laid-Open Patent Publication No. 2003-007349
[PTL 3] Japanese Laid-Open Patent Publication No. 2008-098149

SUMMARY OF INVENTION

Technical Problem

In Patent Literature 1, the internal resistance of the battery is calculated when the charge current is switched, and the amount of voltage drop corresponding to the calculated internal resistance is added to the initial cut-off voltage (end-of-charge voltage), to switch the cut-off voltage accordingly. However, if the cut-off voltage is set by the method of Patent Literature 1, the cut-off voltage may become too high when the internal resistance of the battery is increased. When this happens, the secondary battery falls in an overcharged state, and the cycle characteristics thereof deteriorates.

Patent Literature 2 intends to suppress deterioration of a secondary battery, by setting the charge rate to as low as 0.5 C or less in a region approximate to a fully charged state. However, if constant-current and constant-voltage charging is performed several times, the constant-voltage charging occupies a longer time in the whole charging process, and the charging time is extended. As such, it is difficult to apply this technique to equipment that needs to be charged rapidly.

Patent Literature 3 intends to suppress deterioration, by setting the upper limit of the depth of charge of a secondary battery low. Generally, setting the depth of charge of a secondary battery low is effective in suppress deterioration of a secondary battery. However, a lower depth of charge means a reduction in the actually available capacity. As such, the technique of Patent Literature 3 can only be applied to limited types of applications. For example, it is difficult to apply it to equipment that needs to be charged to a fully charged state, such as power tools.

Under these circumstances, the purpose of the present invention is to provide an effective means for shortening the charging time of a lithium ion secondary battery.

Solution to Problem

One aspect of the present invention is a method for charging a lithium ion secondary battery which includes: a power generation element including a positive electrode, a negative electrode, a separator interposed between the positive electrode and the negative electrode, and a non-aqueous electrolyte; a case accommodating the power generation element and having an opening; and a sealing plate sealing the opening of the case.

The sealing plate has an external terminal of the positive electrode or the negative electrode, and an internal terminal electrically connected to the positive electrode or the negative electrode, the internal terminal and the external terminal being connected to each other and having an electrical resistance therebetween of 0.1 to 2 mΩ.

The charging method includes:

(i) two or more constant-current charging steps in each of which the secondary battery is charged at a constant charge current and which are performed until a charge voltage reaches an end-of-charge voltage Ecsf; and (ii) a constant-voltage charging step which is performed after the charge voltage has reached the end-of-charge voltage Ecsf and in which the secondary battery is charged at the end-of-charge voltage Ecsf until a charge current drops to a predetermined current.

The two or more constant-current charging steps includes:

(a) a constant-current charging in which the secondary battery is charged at a current Ic(1) of 1 to 5 C until the charge voltage reaches a target voltage Ecs(1) satisfying Ecs(1) <Ecsf; and (b) a constant-current charging which is performed after the charge voltage has reached the target voltage Ecs(1) and in which the secondary battery is charged at a current Ic(k) satisfying Ic(k)≤Ic(1) until the charge voltage reaches a target voltage Ecs(k) higher than the target voltage Ecs(1), the target voltage Ecs(k) satisfying Ecs(k)≤Ecsf.

Another aspect of the present invention is a battery pack including: at least one lithium ion secondary battery which includes a power generation element, a case accommodating the power generation element and having an opening, and a sealing plate sealing the opening of the case, the power generation element including a positive electrode, a negative electrode, a separator interposed between the positive electrode and the negative electrode, and a non-aqueous electrolyte; and a controller for controlling charging of the lithium ion secondary battery.

The sealing plate has an external terminal of the positive electrode or the negative electrode, and an internal terminal electrically connected to the positive electrode or the negative electrode, the internal terminal and the external terminal being connected to each other and having an electrical resistance therebetween of 0.1 to 2 mΩ.

The controller performs:

(i) two or more constant-current charging steps in each of which the secondary battery is charged at a constant charge current and which are performed until a charge voltage reaches an end-of-charge voltage Ecsf; and (ii) a constant-voltage charging step which is performed after the charge voltage has reached the end-of-charge voltage Ecsf and in which the secondary battery is charged at the end-of-charge voltage Ecsf until a charge current drops to a predetermined current.

The two or more constant-current charging steps includes:

(a) a constant-current charging in which the secondary battery is charged at a current Ic(1) of 1 to 5 C until the charge voltage reaches a target voltage Ecs(1) satisfying Ecs(1) <Ecsf; and (b) a constant-current charging which is performed after the charge voltage has reached the target voltage Ecs(1) and in which the secondary battery is charged at a current Ic(k) satisfying Ic(k)≤Ic(1) until the charge voltage reaches a target voltage Ecs(k) higher than the target voltage Ecs(1), the target voltage Ecs(k) satisfying Ecs(k)≤Ecsf.

While the novel features of the invention are set forth particularly in the appended claims, the invention, both as to organization and content, will be better understood and appreciated, along with other objects and features thereof, from the following detailed description taken in conjunction with the drawings.

Advantageous Effects of Invention

According to the present invention, it is possible to shorten the charging time of a lithium ion secondary battery, without significantly sacrificing the charge/discharge cycle life characteristics thereof.

DESCRIPTION OF EMBODIMENTS

Figure 1:
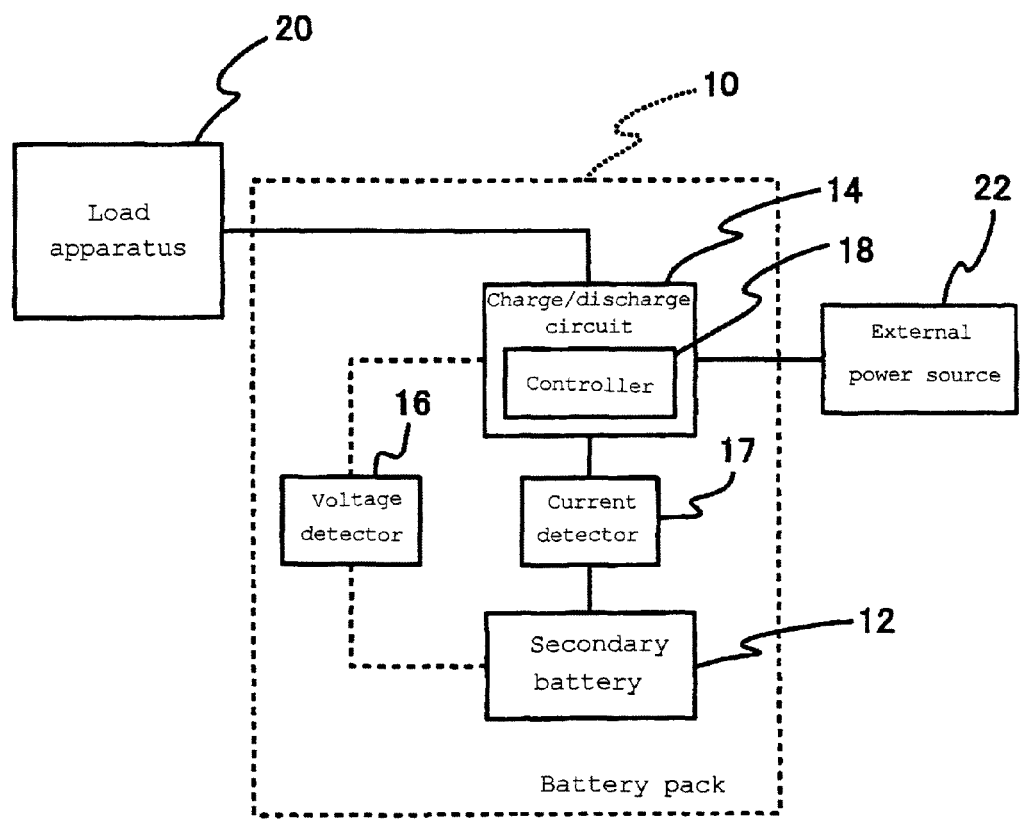
FIG. 1 A function block diagram of a battery pack to which a method for charging a lithium ion secondary battery according to one embodiment of the present invention is applied.

The present invention relates to a method for charging a lithium ion secondary battery including a positive electrode, a negative electrode, a separator interposed between the positive electrode and the negative electrode, a non-aqueous electrolyte, a case having an opening, and a sealing plate sealing the opening of the case. The positive electrode, the negative electrode, the separator, and the non-aqueous electrolyte are accommodated in the case. The opening of the case accommodating the positive electrode, the negative electrode, the separator, and the non-aqueous electrolyte is sealed by the sealing plate.

The case may be of any shape, such as cylindrical or prismatic. The case usually has one opening, but not limited thereto, and may be, for example, a cylindrical or prismatic case having two openings at both ends. In this case, the openings at both ends are each sealed by a sealing plate. As described above, the present invention is applicable also to a secondary battery having two or more sealing plates.

The sealing plate has an external terminal of the positive or negative electrode, and an internal terminal electrically connected to the positive or negative electrode. The internal terminal and the external terminal are electrically connected to each other and have an electrical resistance therebetween of 0.1 to 2 mΩ. When the secondary battery has two or more sealing plates, the electrical resistance of each sealing plate is 0.1 to 2 mΩ.

In this method, charging is controlled such that, in a region where the charge voltage is below an end-of-charge voltage Ecsf, the secondary battery is subjected to constant-current charging with two or more target voltages including the end-of-charge voltage Ecsf, and after the charge voltage has reached the end-of-charge voltage Ecsf, the secondary battery is subjected to constant-voltage charging at the end-of-charge voltage Ecsf until the charge current drops to a predetermined current. In other words, this method relates to a technique for improving the conventional constant-current and constant-voltage charging. In the conventional constant-current and constant-voltage charging, the constant-current charging and the constant-voltage charging each comprise one step, whereas in this method, the constant-current charging comprises two or more steps.

Specifically, (i) in the region where the charge voltage is below an end-of-charge voltage Ecsf, (a) the secondary battery is subjected to constant-current charging at a predetermined current Ic(l) within the range of 1 to 5 C until the charge voltage reaches a minimum target voltage Ecs(1). Subsequently, (b) after the charge voltage has reached the minimum target voltage Ecs(1), target voltages Ecs(k) are switched such that the secondary battery is subjected to constant-current charging until the charge voltage reaches at least one other target voltage Ecs(k) higher than the target voltage Ecs(1), at a current Ic(k) determined for every target voltage Ecs(k). Here, Ecs(k)≤Ecsf, and Ic(k)<Ic(l). Constant-voltage charging is not performed between the first constant-current charging (step (a)) and the subsequent constant-current charging (step (b)). Here, k=2, 3, . . . ; however, k is usually up to 2.

As described above, by subjecting the secondary battery to constant-current charging at a considerably high charge rate of 1 to 5 C (the charge rate is generally less than 1 C) until the charge voltage reaches the minimum target voltage Ecs(1), the secondary battery can be charged for a shorter period of time than usual. Here, 1 C is a current at which the quantity of electricity corresponding to the nominal capacity of the secondary battery can be charged in one hour. The charge rate is more preferably 2 to 5 C, and furthermore preferably 3 to 5 C.

Raising the charge rate generally results in a shorter life of the secondary battery as described above. Therefore, merely by raising the charge rate, it is impossible to shorten the charging time while suppressing deterioration in cycle characteristics of the secondary battery. The reason why charging at a high rate as described above is possible in the method according to the present invention is in that the electrical resistance between the internal terminal and the external terminal in the sealing plate is suppressed very low.

Here, the ratio of the current Ic(k) to Ic(l) is 0.1 to 0.7, and the difference ΔV between the target voltages Ecs(k) and Ecs(1) is 0.05 to 0.2 V. By setting the ratio of the current Ic(k) to the high-rate current Ic(l) of 1 to 5 C within the above range, the charging time can be effectively shortened without sacrificing the cycle characteristics. Further, by setting the difference ΔV between the target voltages Ecs(k) and Ecs(1) within the above range, the charging time can be more effectively shortened without sacrificing the cycle characteristics.

It should be noted that the "cycle characteristics" are a relationship between the number of cycles and the discharge capacity, when charging and discharging of a secondary battery are repeated within a predetermined voltage range and under predetermined conditions. The number of cycles repeated until the discharge capacity is reduced by a predetermined percentage from the initial capacity is referred to as a "cycle life" of the secondary battery, or simply referred to as a "life".

In many of lithium ion secondary batteries, a PTC (positive temperature coefficient) element for shutting off the current when the battery temperature is increased is provided between the internal and external terminals in the sealing plate. The electrical resistance at room temperature of a PTC element is higher than those of commonly used conducive materials (metals such as aluminum). Therefore, the electrical resistance of a sealing plate including a PTC element is usually about 10 to 13 mΩ.

In the method according to the present invention, since the electrical resistance of the sealing plate (i.e., the electrical resistance between the internal and external terminals; the same applies hereinafter) is as low as 0.1 to 2 mΩ, the deterioration of the secondary battery can be suppressed even though high-rate charging is performed. As such, for example, when a lithium ion secondary battery having a nominal capacity of 1.3 to 2.2 Ah in a fully charged state is discharged at 1 C, the internal resistance can be suppressed to 10 to 25 mΩ.

More specifically, when the electrical resistance of the sealing plate is high, the internal resistance of the secondary battery as a whole is also high. As a result, if the charge current is raised, the voltage drop is increased. Therefore, the charge voltage must be set considerably high for charging at a high rate as described above. However, when the charge voltage of the secondary battery is increased, the deterioration of the secondary battery is accelerated, causing the life to be shortened. For this reason, by reducing the internal resistance of the secondary battery, the deterioration of the secondary battery when charged at a high rate can be suppressed.

Here, the easiest and most convenient method for suppressing the internal resistance of the secondary battery is to reduce the electrical resistance of the sealing plate. Of course, there are other methods that can reduce the internal resistance of the secondary battery. However, if the internal resistance of the secondary battery is decreased by other methods, the power generation ability of the battery may be affected. According to the present invention, the above effect can be obtained without adversely affecting the power generation ability of the battery.

According to one embodiment of the present invention, the positive electrode includes, as its material, a lithium-containing composite oxide represented by the general formula: $LiNi_xCo_yM_{1-x-y}O_2$, where M is at least one element selected from the group consisting of Group 2 elements, Group 3 elements, Group 4 elements, Group 7 elements, and Group 13 elements in the long-form periodic table, 0.3≤x<1, and 0<y<0.4.

When charged by constant-current and constant-voltage method, it is easier to shorten the charging time of a lithium ion secondary battery using a lithium nickel oxide-based lithium-containing composite oxide (hereinafter referred to as a "Ni-based positive electrode material") as a positive electrode material (specifically, a positive electrode active material) (hereinafter referred to as a "Ni-based positive electrode battery") than that of a lithium ion secondary battery using a lithium cobalt oxide-based lithium-containing composite oxide (hereinafter referred to as a "Co-based positive electrode material") as a positive electrode material (hereinafter referred to as a "Co-based positive electrode battery").

This is because the potential of the Ni-based positive electrode material is lower than that of the Co-based positive electrode material, when compared at the same depth of charge. In other words, the profile of charge voltage of the Ni-based positive electrode battery is lower than that of the Co-based positive electrode battery. As such, even if batteries having the same capacity are charged at the same current, it takes a longer time for the charge voltage to reach the minimum target voltage in the Ni-based positive electrode battery than in the Co-based positive electrode battery. As a result, the ratio of the constant-current charging region in the whole charging process can be increased.

Therefore, even when charging the Ni-based positive electrode battery and the Co-based positive electrode battery to the same target voltage, the quantity of electricity can be charged to a greater percentage by constant-current charging in the Ni-based positive electrode battery than in the Co-based positive electrode battery. Since the charge rate (charge current) in constant-current charging is higher than that in constant-voltage charging, the charging time can be shortened by increasing the ratio of the constant-current charging region in the whole charging process.

Accordingly, charging of the Ni-based positive electrode battery, even if the charge current is reduced, can be completed for almost the same charging time as the Co-based positive electrode battery. As a result, simply by setting the charging time for the Ni-based positive electrode battery to be almost the same as that for the Co-based positive electrode battery, the cycle characteristics of the Ni-based positive electrode battery can be improved. For the reason above, by using a lithium-containing composite oxide represented by the above general formula as the positive electrode material, it is possible to easily shorten the charging time, while suppressing deterioration in cycle characteristics.

According to one preferred embodiment of the present invention, the minimum target voltage Ecs(1) is set to 3.8 to 4V. In charging at a high rate as described above, by setting the target voltage Ecs(1) to 4 V or less, it is possible to prevent the acceptance of lithium ions at the negative electrode from being deteriorated. As a consequence, the deterioration in cycle characteristics can be prevented. On the other hand, by setting the target voltage Ecs(1) to 3.8 V or more, it is possible to more effectively shorten the charging time. A more preferred range of the target voltage Ecs(1) is from 3.8 to 3.9 V.

Further, by setting the current Ic(1) associated with the target voltage Ecs(1) to 5 C or less, it is possible to prevent the acceptance of lithium ions at the negative electrode from being deteriorated. As a consequence, the deterioration in cycle characteristics can be prevented.

Furthermore, by reducing the internal resistance of the secondary battery, it is possible to reduce the energy loss, particularly in equipment classified as power tools which is charged and discharged at a high rate.

According to the one embodiment of the present invention, at least one other target voltage Ecs(k) higher than the forgoing minimum target voltage Ecs(1) is set to 4 to 4.2 V.

A maximum target voltage Ecs(k) is the end-of-charge voltage. By setting the end-of-charge voltage to 4.2 V or less, it is possible to inhibit side reaction such as decomposition reaction of electrolyte. As a consequence, the deterioration in cycle characteristics can be prevented.

According to the one embodiment of the present invention, the current Ic(k) to be set for each at least one other target voltage Ecs(k) is 0.5 to 2 C, which is lower than the current Ic(1).

By setting the current Ic(k) to be a comparatively small current of 0.5 to 2 C in a voltage range higher than the minimum target voltage Ecs(1), it is possible to prevent the acceptance of lithium ions at the negative electrode from being deteriorated. As a consequence, the deterioration in cycle characteristics which is caused by charging at a high rate in a high voltage range can be suppressed. A more preferred range of the current Ic(k) is 0.5 to 1.5 C.

In another embodiment of the present invention, the frequency of use of the secondary battery is detected, and on the basis of the detected frequency of use, the current Ic(l) is corrected such that the higher the frequency of use is, the lower the current Ic(l) is. The frequency of use of the secondary battery can be detected by, for example, counting how many times the secondary battery has been charged.

The internal resistance or polarization voltage of a secondary battery tends to increase as the frequency of use thereof is increased. Because of this, if the charge current is set constant regardless of increasing frequency of use, the charge voltage becomes higher than the initial voltage. As such, by decreasing the current Ic(1) with an increase in the frequency of use, it is possible to prevent the ratio of the charging time at a high rate current Ic(1) to the whole charging time from being decreased. Therefore, it will not happen that the effect to shorten the charging time is not sufficiently obtained.

At this time, for example, the current Ic(1) may be lowered by a predetermined amount $\Delta I1$ every time when the secondary battery is charged and discharged once, or alternatively, the current Ic(1) may be lowered by a predetermined amount $\Delta I2$ ($\Delta I2 > \Delta I1$) every time when the secondary battery is repeatedly charged and discharged several times. Here, the current Ic(1) can be lowered according to the percentage of deterioration of the secondary battery or electrodes calculated from the data acquired in advance regarding the cycle characteristics of the secondary battery.

For example, provided that the percentage of deterioration of the battery per one cycle obtained from the above date (e.g., the percentage of capacity reduction) is Q(%), when the current Ic(1) at the $(n-1)^{th}$ cycle is denoted by P, where n is an integer of 2 or more, the current Ic(1) at the $n^{th}$ cycle can be set to $P \times (1-Q/100)$. As a guideline, it is preferable to lower the current Ic(1) by 10 to 20% at the time when the capacity drops to 80% of the initial capacity.

Alternatively, for example, the current Ic(1) may be reduced such that it is reduced by a greater percentage in the initial stage, and after the number of cycles has increased to exceed a certain level, reduced by a smaller percentage. This is because the polarization voltage tends to greatly increase particularly in the initial stage.

It should be noted that, when this method is applied to a battery pack, for example, a cycle count function of a battery management unit (BMU) mounted in the battery pack may be used to count the number of times the secondary battery has been charged.

Further, the present invention relates to a battery pack including: at least one lithium ion secondary battery which includes a positive electrode, a negative electrode, a separator interposed between the positive electrode and the negative electrode, a non-aqueous electrolyte, a case having an opening, and a sealing plate sealing the opening of the case; and a controller for controlling charging of the lithium ion secondary battery.

The sealing plate has an external terminal of the positive electrode or the negative electrode, and an internal terminal electrically connected to the positive electrode or the negative electrode. The internal terminal and the external terminal are connected to each other, and The electrical resistance therebetween is 0.1 to 2 m$\Omega$.

The controller controls such that, in a region where the charge voltage is below an end-of-charge voltage Ecsf, the secondary battery is subjected to constant-current charging with two or more target voltages including the end-of-charge voltage Ecsf, and after the charge voltage has reached the end-of-charge voltage Ecsf, the secondary battery is subjected to constant-voltage charging at the end-of-charge voltage Ecsf until the charge current drops to a predetermined current.

Specifically, the controller controls such that (i) in the region where the charge voltage is below an end-of-charge voltage Ecsf, (a) the secondary battery is charged at a predetermined current Ic(l) within the range of 1 to 5 C until the charge voltage reaches a minimum target voltage Ecs(1).

Subsequently, (b) after the charge voltage has reached the minimum target voltage Ecs(1), target voltages Ecs(k) are switched such that the secondary battery is charged at a current Ic(k) which is set for every target voltage Ecs(k), by using at least one other target voltage Ecs(k) higher than the target voltage Ecs(1). Here, Ecs(1)≤Ecsf, and Ic(k)<Ic(1).

In the battery pack according to the present invention, preferably, a counter for counting the number of charging times of the secondary battery is provided, and on the basis of the number of charging times, the controller corrects the current Ic(1) such that the larger the number of charging times is, the lower the current Ic(1) is.

More preferably, a fuse is interposed between the internal terminal and the external terminal. By including the fuse between the internal terminal and the external terminal, it is possible to shut off the current when an excessive current flows through the secondary battery. Hence, the PTC element can be excluded from the sealing plate and the like.

As a result, the electrical resistance of the sealing plate and the like can be easily decreased.

An embodiment of the present invention is described below with reference to the appended drawings.

Embodiment 1

FIG. 1 is a function block diagram showing a battery pack to which a method for charging a lithium ion secondary battery according to Embodiment 1 of the present invention is applied.

A battery pack 10 includes a secondary battery 12, a charge/discharge circuit 14, a voltage detector 16 for detecting the voltage of the secondary battery 12, and a current detector 17 for detecting the current of the secondary battery 12. The battery pack 10 is capable of being connected to a load apparatus 20 and an external power source 22.

The charge/discharge circuit 14 includes a controller 18. The secondary battery 12 in the battery pack 10 may be one lithium ion secondary battery, or alternatively, a battery group comprising a plurality of lithium ion secondary batteries connected to each other in parallel and/or series. The controller 18 may be provided independently from the charge/discharge circuit 14. Some of the below-described controlling functions of the controller 18 may be incorporated into the load apparatus 20, or a charger for charging the battery pack 10, or the like.

The load apparatus 20 is connected to the secondary battery 12 via the charge/discharge circuit 14. The secondary battery 12 is connected to the external power source 22, such as a commercial power source, via the charge/discharge circuit 14. The voltage detector 16 detects the open circuit voltage (OCV) and the closed circuit voltage (CCV) of the secondary battery 12, and transmits the detected values to the controller 18.

The controller 18 basically controls such that the secondary battery 12 is charged and discharged within a predetermined voltage region. Such a controller may be composed of, for example, a central processing unit (CPU), a microcomputer, a micro processing unit (MPU), a main memory, and an auxiliary memory.

The auxiliary memory (e.g., a nonvolatile memory) stores information regarding target voltages for constant-current charging of the secondary battery 12, information regarding charge currents, information regarding end-of-charge voltages, information regarding end-of-discharge voltages, and information regarding correction amounts of charge current to be corrected according to the frequency of use of the secondary battery (e.g., a charge current correction table).

The information regarding charge currents includes charge currents (Ic(1) and Ic(k), described below) respectively associated with two or more target voltages (Ecs(1) and Ecs(k), described below).

Next, one example of the lithium ion secondary battery used in the secondary battery 12 is described with reference to FIG. 2. It should be noted that a lithium ion secondary battery 24 shown in the figure has a cylindrical shape, but the present invention is not limited thereto, and is applicable to lithium ion secondary batteries having various shapes such as a prismatic shape, a flat shape, a pin shape.

The lithium ion secondary battery 24 includes an electrode group 31 formed by spirally winding a positive electrode 26, a negative electrode 28, and a separator 30 interposed therebetween. The electrode group 31 is accommodated together with a non-aqueous electrolyte (not shown) in a bottomed cylindrical metal case 32 having an opening. In the interior of the case 32, an upper insulating plate 36 and a lower insulating plate 38 are provided on the top and the bottom of the electrode group 31, respectively.

The opening of the case 32 is sealed by a sealing plate assembly 34, by which the electrode group 31 and the non-aqueous electrolyte are hermetically accommodated in the case 32. The sealing plate assembly 34 is supported on a small diameter portion 46 formed in the upper portion of the case 32, while being electrically insulated from the case 32 by a gasket 44 as an insulator. In this state, the opening end of the case 32 is clamped such that the peripheral portion of the sealing plate assembly 34 is sandwiched between the small diameter portion 46 and the opening end, with the gasket 44 interposed therebetween, whereby the sealing plate assembly 34 is mounted at the opening of the case 32.

The sealing plate assembly 34 includes a hat-shaped terminal plate 34a, an annular PTC element 34b, a circular (metal) thin plate 34c, an annular gasket 34d, a circular intermediate plate 34f having a protrusion 34e in its center, and a saucer-shaped bottom plate 34g. The terminal plate 34a, the intermediate plate 34f, and the bottom plate 34g each have at least one gas vent hole 34h.

The peripheral portion of the terminal plate 34a is in contact with the PTC element 34b. The PTC element 34b is in contact with the thin plate 34c. As a result, the terminal plate 34a is electrically connected to the thin plate 34c via the PTC element 34b.

Disposed between the thin plate 34c and the intermediate plate 34f is the gasket 34d. The gasket 34d electrically insulates the peripheral portion of the thin plate 34c from the peripheral portion of the intermediate plate 34f. On the other hand, the central portion of the thin plate 34c is welded to the protrusion 34e of the intermediate plate 34f. This provides electrical connection between the thin plate 34c and the intermediate plate 34f. The peripheral portion of the bottom plate 34g is in contact with the peripheral portion of the intermediate plate 34f.

As a result of the above, the bottom plate 34g and the terminal plate 34a are electrically connected to each other. The bottom plate 34g is connected to the positive electrode 26 via a positive electrode lead 40. As such, the bottom plate 34g functions as an internal terminal of the positive electrode 26, the terminal being provided in the sealing plate assembly 34. On the other hand, the terminal plate 34a functions as an external terminal of the positive electrode 26. The negative electrode 28 is connected to the bottom of the case 32 via a negative electrode lead 42, and the case 32 as a whole functions as an external terminal of the negative electrode 28. Alternatively, the negative electrode 28 may be connected to the bottom plate 34g via a lead, so that the bottom plate 34g can function as an internal terminal of the negative electrode 28, the terminal being provided in the sealing plate assembly 34, while the terminal plate 34a can function as an external terminal of the negative electrode 28. In this configuration, the positive electrode 26 is connected to the case 32 via a lead, and the case 32 functions as an external terminal of the positive electrode 26.

If the battery current is increased excessively for some reason, the temperature of the PTC element 34b rises, and the resistance of the PTC element 34b drastically increases. This shuts down the current between the bottom plate 34g and the terminal plate 34a. Further, if the internal pressure of the battery is increased for some reason, the central portion of the thin plate 34c comparatively easily ruptures. When the central portion of the thin plate 34c ruptures, the thin plate 34c fails to contact with the intermediate plate 34f, and the current therebetween is shut off.

The electrical resistance between the bottom plate 34g in the sealing plate assembly 34 and the terminal plate 34a at room temperature (e.g., at 25° C.) is suppressed within the range of 0.1 to 2 mΩ. The electrical resistance at room temperature of the conventional sealing plate assembly is about 12 to 13 mΩ.

In order to suppress the electrical resistance of the sealing plate assembly 34 within the above range, the PTC element 34b is preferably one whose electrical resistance at room temperature (e.g., at 25° C.) is low. Alternatively, the PTC element 34b may be replaced with an electrical fuse.

Figure 3:
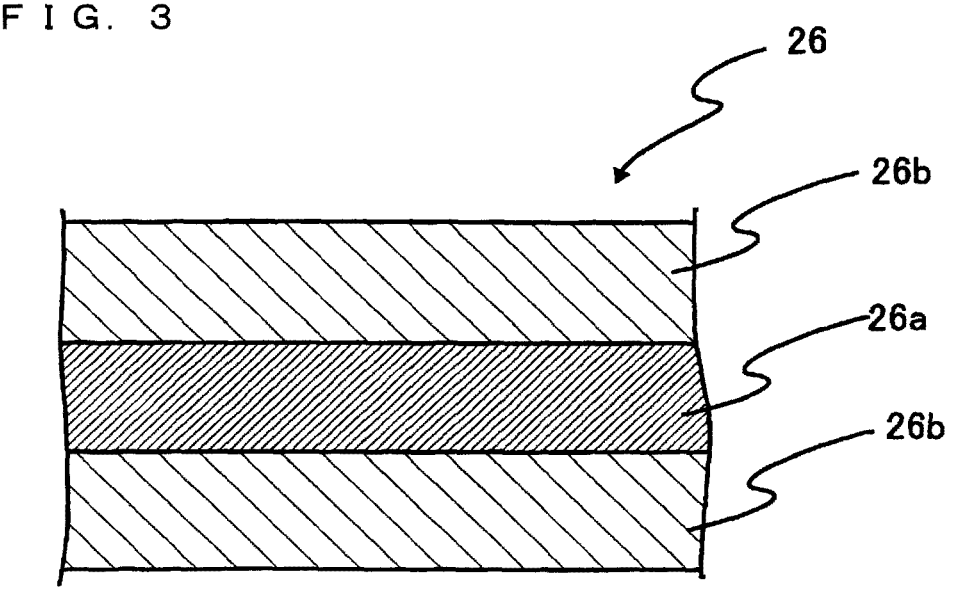
FIG. 3 A cross-sectional view of one example of a positive electrode included in the above lithium ion secondary battery.

As shown in FIG. 3, the positive electrode 26 includes: a positive electrode current collector 26a made of, for example, aluminum foil; and a positive electrode active material layer 26b formed on at least one surface of the positive electrode current collector 26a. The positive electrode active material layer 26b is made of a mixture of a positive electrode active material, an electrically conductive material and a binder.

The positive electrode active material is preferably a lithium-containing composite oxide represented by the general formula: $LiNi_xCo_yM_{1-x-y}O_2$, where M is at least one element selected from the group consisting of Group 2 elements, Group 3 elements, Group 4 elements, Group 7 elements, and Group 13 elements in the long-form periodic table, $0.3 \leq x < 1$, and $0 < y < 0.4$. By using this lithium-containing composite oxide, the charging time can be remarkably shortened, and the charge/discharge cycle life characteristics can be notably improved. Such a lithium-containing composite oxide can be prepared by a known method.

By setting x to be 0.3 or more, reduction in the charge voltage due to the use of a Ni-based positive electrode materiel can be remarkable. Similarly, by setting y to be less than 0.4, reduction in the charge voltage can be remarkable. By adding the above M, it is possible to improve the charge/discharge cycle life characteristics, as well as to easily achieve a higher capacity. Examples of the Group 2 elements include Mg and Ca. Examples of the Group 3 elements include Sc and Y. Examples of the Group 4 elements include Ti and Zr. Examples of the Group 7 elements include Mn. Examples of the Group 13 elements include B and Al. Among these, M is most preferably Al because it has a highly stable crystal structure and can ensure safety.

Examples of the conductive material include natural graphite, artificial graphite, and carbon materials such as carbon black and acetylene black. Examples of the binder include polyvinylidene fluoride (PVDF) and polytetrafluoroethylene (PTFE). The positive electrode current collector may be made of a metal foil such as aluminum foil. The positive electrode can be obtained by allowing a mixture of the positive electrode active material, the conductive material and the binder to be dispersed in a dispersion medium such as N-methyl-2-pyrrolidone, to prepare a positive electrode paste, applying the paste onto the positive electrode current collector, and drying the paste.

Similarly to the positive electrode 26, the negative electrode 28 also includes a negative electrode current collector and a negative electrode active material layer formed on the negative electrode current collector. The negative electrode active material layer is made of a mixture of a negative electrode active material, an electrically conductive material and a binder. Examples of the negative electrode active material include carbon materials capable of absorbing and desorbing lithium, artificial graphite, and natural graphite. The negative electrode current collector may be made of a metal foil such as nickel foil or copper foil. Examples of the conductive material and the binder are the same as those for the positive electrode. The negative electrode can be obtained by allowing a mixture of the negative electrode active material, the conductive material and the binder to be dispersed in a dispersion medium such as N-methyl-2-pyrrolidone, to prepare a negative electrode paste, applying the paste onto the negative electrode current collector, and drying the paste.

The electrolyte includes a non-aqueous solvent and a supporting salt dissolved in the non-aqueous solvent. Examples of the supporting salt include lithium salts such as lithium hexafluorophosphate ($LiPF_6$). Examples of the non-aqueous solvent include cyclic esters such as ethylene carbonate (EC) and propylene carbonate (PC), and chain esters such as dimethyl carbonate (DMC), diethyl carbonate (DEC) and methyl ethyl carbonate (MEC).

Figure 4:
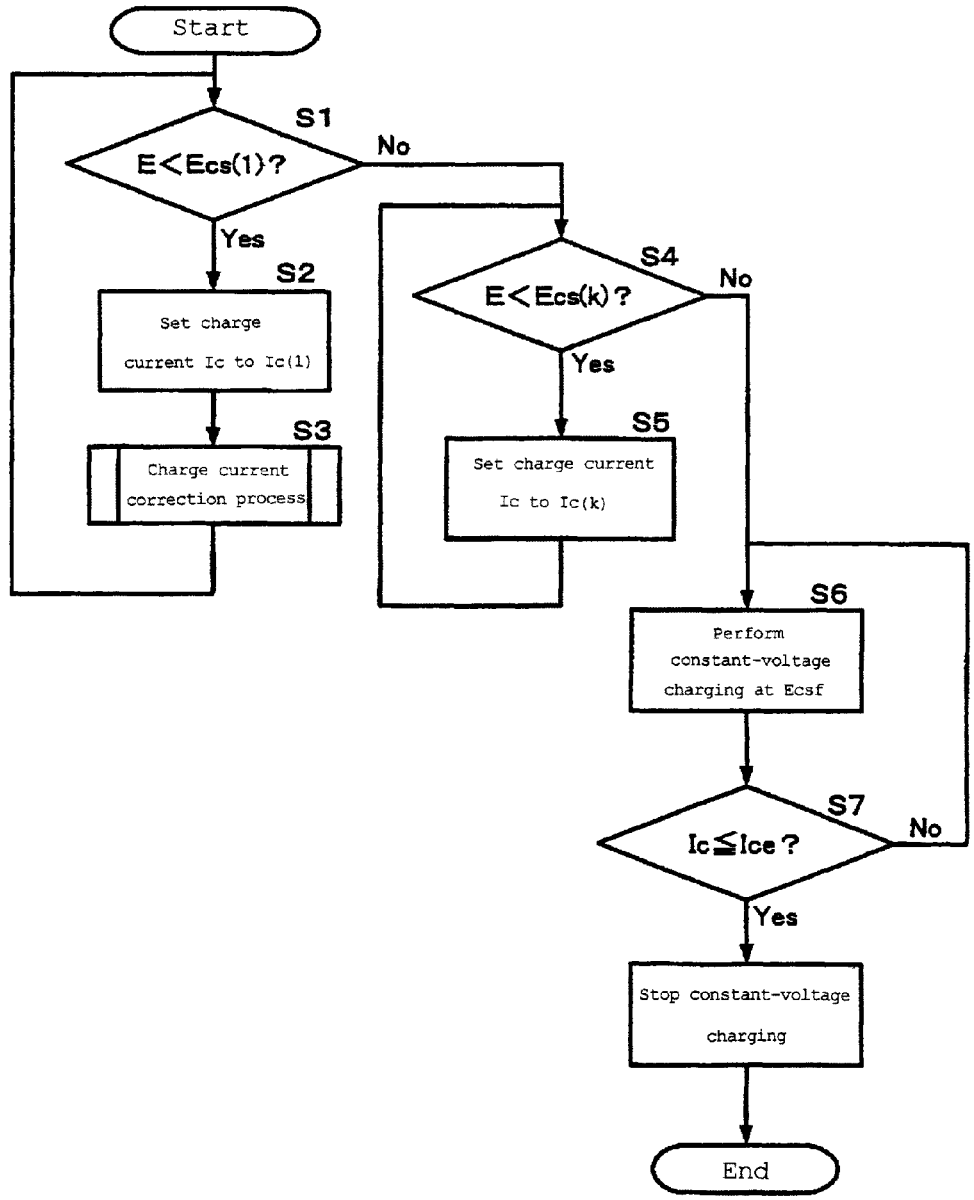
FIG. 4 A flowchart of charging process in a method for charging a lithium ion secondary battery according to one embodiment of the present invention.
Figures 5, 6:
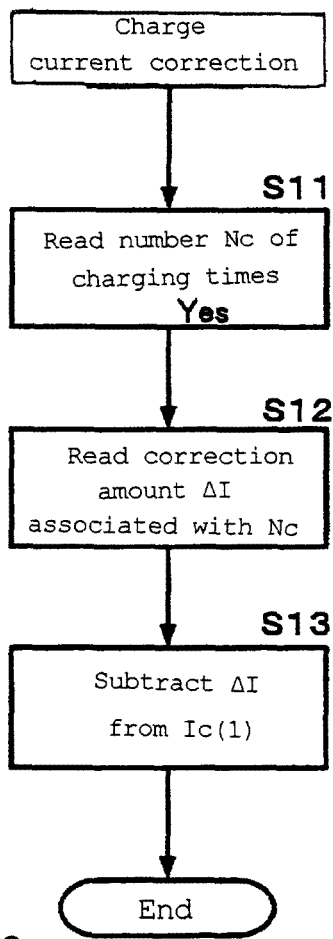
FIG. 5 A flowchart of charge current correction process in the above charging process.
FIG. 6 A table showing an example of information regarding charge currents.

The charging process performed by the controller 18 is described below with reference to FIGS. 4 and 5. FIGS. 4 and 5 are flowcharts showing the process performed by, for example, a CPU, in the controller.

In FIG. 4, upon start of the charging of the secondary battery 12, the voltage E of the secondary battery 12 detected by the voltage detector 16 is compared with the minimum target voltage Ecs(1), to judge whether E is below Ecs(1) (Step S1).

If the voltage E is below the target voltage Ecs(1) ("Yes" in step S1), a current Ic(1) associated with the target voltage Ecs(1) is read from the above-mentioned information regarding charge currents, and the charge current Ic is set to the Ic(1) (Step S2). The set current Ic(1) is corrected through a charge current correction process described below (Step S3), and thereby, the secondary battery 12 is constant-current charged at the corrected current Ic(1). It should be noted that the charge current correction process can be omitted. When the charge current correction process is omitted, the secondary battery 12 is constant-current charged at the current Ic(1) set in Step S2.

Here, Ecs (1) is a constant voltage within the range of 3.8 to 4 V. Ic(1) before correction is a constant current within the range of 1 to 5 C.

Upon passage of a predetermined period of time (e.g., 5 ms) after Step S3, the process returns to Step S1. The procedures from Step S1 to Step S3 are repeated until the voltage E becomes equal to or above the target voltage Ecs(1) ("No" in Step S1).

If the voltage E is equal to or above the target voltage Ecs(1) ("No" in step S1), the voltage E is compared with another target voltage Ecs(k), to judge whether E is below Ecs(k) (Step S4). Here, Ecs(k) is at least one target voltage which is higher than Ecs(1).

Here, when only one target voltage is used as the target voltage Ecs(k) higher than the target voltage Ecs(1), the Ecs (k) is a voltage equal to the end-of-charge voltage Ecsf of the secondary battery 12. On the other hand, when two or more target voltages Ecs(k) are set, the highest among these is the end-of-charge voltage Ecsf, and the others are voltages higher than Ecs(1) and lower than Ecsf.

If the voltage E is below the target voltage Ecs(k) ("Yes" in Step S4), a current Ic(k) associated with the target voltage Ecs(k) is read from the above-mentioned information regarding charge currents, and the charge current Ic is set to the current Ic(k) (Step S5). The secondary battery 12 is constant-current charged at the set current Ic(k). Here, Ecs(k) is preferably a voltage within the range of 4 to 4.2 V. Ic(k) is preferably within the range of 0.5 to 2 C.

Upon passage of a predetermined period of time (e.g., 5 ms) after Step S5, the process returns to Step S4. The procedures of Step S4 and Step S5 are repeated until the voltage E becomes equal to or above the target voltage Ecs(k) ("No" in Step S4).

When two or more target voltages are set as the target voltages Ecs(k) higher than the target voltage Ecs (1), the target voltages are used in the ascending order from lower to higher, to perform the procedures of Steps S3 and S4. If the voltage E is equal to or above the maximum target voltage Ecs(k) (i.e., the end-of-charge voltage Ecsf) ("No" in Step S4), the constant-current charging is terminated, and the charging mode is switched to the constant-voltage charging mode, followed by the start of constant-voltage charging of the secondary battery 12 at the end-of-charge voltage Ecsf (Step S6).

On the other hand, when only one target voltage is set as the target voltages Ecs(k) higher than the target voltage Ecs(1), if the voltage E is equal to or above the target voltage Ecs(k) (i.e., the end-of-charge voltage Ecsf) ("No" in Step S4), the constant-voltage charging of the secondary battery 12 at the end-of-charge voltage Ecsf is started (Step S6).

Upon start of the constant-voltage charging, the charge current Ic is compared with a predetermined end-of-charge current Ice, to judge whether Ic is equal to or below Ice (Step S7). If Ic is above Ice ("No" in Step S7), upon passage of a predetermined period of time, the procedure of Step S6 is performed again. The procedures of Steps S6 and S7 are repeated until Ic becomes equal to or below Ice ("Yes" in Step S7). The end-of-charge current Ice may be set to, for example, 50 to 140 mA.

If Ic is equal to or below Ice ("Yes" in Step S7), the charging is stopped (Step S8), and the process is terminated.

Next, a charge current correction process is described with reference to FIG. 5. FIG. 5 is a flowchart showing one example of the charge current correction process.

The example shown in FIG. 5 is based on the precondition that the controller 18 is provided with a charge time counter that counts the number of times the secondary battery 12 has been charged. The frequency of use of the secondary battery 12 is represented by the number of charging times counted by the charge time counter. With regard to the number of charging times, for example, when a quantity of electricity corresponding to a predetermined percentage or more of the nominal capacity of the secondary battery is charged continuously, it is counted as "one" charging.

Other than the above, the percentage of deterioration of the secondary battery, for example, the percentage of reduction in capacity may be used as the parameter representing the frequency of use of the secondary battery 12 as described above. In addition, by measuring the internal resistance of the secondary battery 12, the amount of increase in the internal resistance may be used as the parameter representing the frequency of use of the secondary battery 12.

In the charge current correction process, the parameter representing the frequency of use of the secondary battery 12, which is the number Nc of charging times counted by the above charge time counter in this example, is read (Step S11). The number Nc of charging times is checked against a charge current correction table comprising table data showing the corresponding relationship between the number of charging times and the correction amount $\Delta I$ of the current Ic(1), and an optimum correction amount $\Delta I$ of the current Ic(1) associated with the number Nc of charging times is read (Step S12).

FIG. 6 shows one example of the charge current correction table. In this example, in the charge current correction table, correction amounts: $\Delta I1$, $\Delta I2$, $\Delta I3$, . . . , where $\Delta I1 < \Delta I2 < \Delta I3$, are respectively set for the ranges of the number Nc of charging times: from Nc1 to Nc2, from Nc2 to Nc3, from Nc3 to Nc4, . . . , where Nc1<Nc2<Nc3<Nc4 and Nc2−Nc1=Nc3−Nc2=Nc4−Nc3. Here, the correction amounts may be set such that the amount of increase from $\Delta I1$ to $\Delta I2$, from $\Delta I2$ to $\Delta I3$, . . . , is gradually decreased, in view of the polarization voltage whose increase rate is high initially.

Alternatively, as described above, the charge current may be corrected by calculating a specific correction amount from the data regarding the percentage of deterioration of the secondary battery that have been obtained beforehand for the secondary battery 12, and subtracting the specific correction amount from Ic(1) after every one charge cycle (see Examples 9 and 10).

Subsequently, the searched correction amount $\Delta I$ is subtracted from the current Ic(1) set in Step S2 (Step S13). In this manner, the current Ic(1) is corrected to be optimum according to the frequency of use or the increase in polarization voltage of the secondary battery 12.

Examples of the present invention are described below. It should be noted that the present invention is not limited to the following examples.

Figure 2:
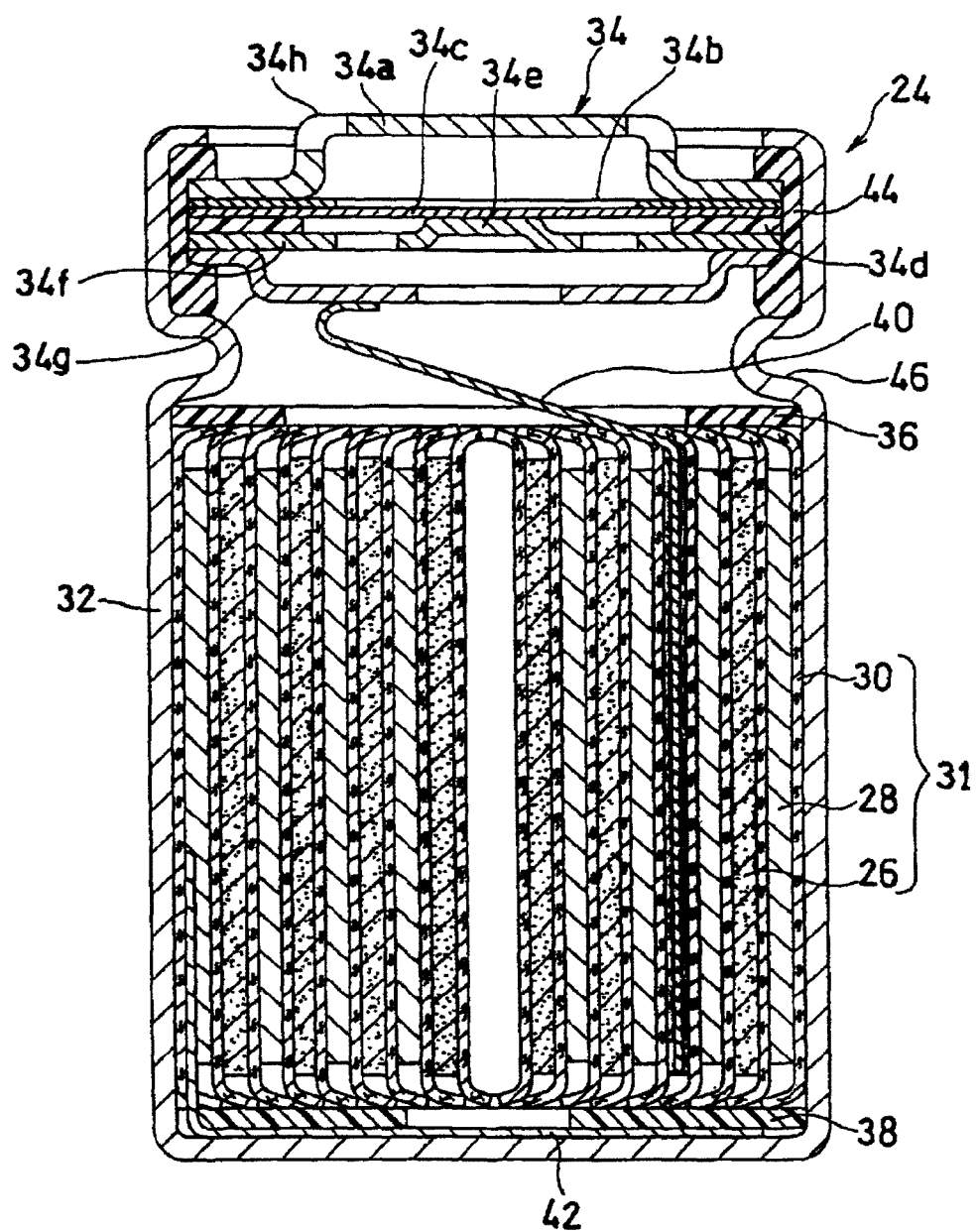
FIG. 2 A cross-sectional view of one example of a lithium ion secondary battery included in the above battery pack.

A cylindrical lithium ion secondary battery as shown in FIG. 2 to be used in the charging method according to the present invention was produced by the following procedures.

(1) Production of Positive Electrode

First, 100 parts by weight of $LiNi_{0.8}Co_{0.15}Al_{0.05}O_2$ serving as a positive electrode active material, 1.7 parts by weight of PVDF serving as a binder, 2.5 parts by weight of acetylene black serving as a conductive material, and an appropriate amount of N-methyl-2-pyrrolidone were stirred in a double arm kneader, to prepare a positive electrode paste.

Subsequently, the positive electrode paste was applied onto both surfaces of a 15-μm-thick positive electrode current collector made of aluminum foil, and dried, to form a positive electrode active material layer on each of both surfaces of the positive electrode current collector. In such a manner, a positive electrode in the form of plate or sheet was obtained. Thereafter, the positive electrode was rolled and cut into a belt-like positive electrode (thickness: 0.110 mm, width: 57 mm and length: 720 mm).

(2) Production of Negative Electrode

First, 100 parts by weight of graphite serving as a negative electrode active material, 0.6 parts by weight of PVDF serving as a binder, 1 part by weight of carboxymethyl cellulose serving as a thickener, and an appropriate amount of water were stirred in a double arm kneader, to prepare a negative electrode paste. Subsequently, the negative electrode paste was applied onto both surfaces of an 8-μm-thick negative electrode current collector made of copper foil, and dried, to form a negative electrode active material layer on each of both surfaces of the negative electrode current collector. In such a manner, a negative electrode in the form of plate or sheet was obtained. Thereafter, the negative electrode was rolled and cut into a belt-like negative electrode (thickness: 0.130 mm, width: 58.5 mm and length: 800 mm).

(3) Preparation of Non-Aqueous Electrolyte $LiPF_6$ was dissolved at a concentration of 1 mol/L in a non-aqueous solvent composed of EC, MEC and DMC mixed in a volume ratio of 1:1:8, to prepare a non-aqueous electrolyte.

(4) Fabrication of Battery

The positive and negative electrodes obtained in the above are spirally wound together with a separator for insulating these electrodes from each other, to form an electrode group. For the separator, a 20-μm-thick polypropylene microporous film was used. The electrode group was inserted into a case (diameter: 18 mm and height: 65 mm). An electrically insulating member was disposed on the top and the bottom of the electrode group. The non-aqueous electrolyte prepared in the above was injected into the case.

A negative electrode lead extended from the negative electrode was welded to the inner bottom surface of the case. Several types of sealing plate assemblies having different electrical resistances were prepared. A positive electrode lead extended from the positive electrode was welded to the bottom surface of each sealing plate assembly. The opening end of the case was clamped onto the peripheral portion of the sealing plate assembly with a gasket interposed therebetween, to seal the opening of the case. In such a manner, several types of 18650-size cylindrical lithium ion secondary batteries for test use (diameter: 18 mm, height: 65 mm and nominal capacity: 1800 mAh) including sealing plate assemblies having different electrical resistances were fabricated. In the sealing plate assembly, the electrical resistance between the external terminal (terminal plate) and the internal terminal (bottom plate) was adjusted mainly by changing the thickness of the PTC element.

Example 1

Among the above-fabricated lithium ion secondary batteries for test use, the one including a sealing plate assembly having an electrical resistance between the bottom plate and the terminal plate of 1 mΩ was used. The lithium ion secondary battery was subjected to constant-current charging at a current of 2 C (Ic(1)) until the charge voltage reached 3.8 V (Ecs(1)) (the first step). After the charge voltage reached 3.8 V, constant-current charging was performed at a charge current of 1 C (Icf) until the charge voltage reached 4.2 V (Ecsf) (the second step). After the charge voltage reached 4.2 V, the battery was subjected to constant-voltage charging at that voltage, with the end-of-charge current set to 50 mA (the third step).

When the charge current dropped to 50 mA, charging was stopped. Upon passage of 20 minutes thereafter, the battery was discharged at a discharge rate of 1 C, with the end-of-discharge voltage set to 2.5 V. The above charge/discharge process was regarded as one cycle, and 300 charge/discharge cycles were performed in total.

Example 2

A total of 300 charge/discharge cycles were performed in the same manner as in Example 1, except that Ecs(1) was set to 4 V in the first step.

Example 3

A total of 300 charge/discharge cycles were performed in the same manner as in Example 1, except that Ic(1) was set to 3 C in the first step.

Example 4

A total of 300 charge/discharge cycles were performed in the same manner as in Example 1, except that Ic(1) was set to 5 C in the first step.

Example 5

A total of 300 charge/discharge cycles were performed in the same manner as in Example 1, except that Ic(1) and Ecs(1) were set to 5 C and 4 V, respectively, in the first step.

Example 6

A total of 300 charge/discharge cycles were performed in the same manner as in Example 1, except that: among the above-fabricated lithium ion secondary batteries for test use, the one including a sealing plate assembly having an electrical resistance of 1.5 mΩ was used; and Ic(1) and Ecs(1) were set to 5 C and 4 V, respectively, in the first step.

Example 7

A total of 300 charge/discharge cycles were performed in the same manner as in Example 1, except that: among the above-fabricated lithium ion secondary batteries for test use, the one including a sealing plate assembly having an electrical resistance of 2 mΩ was used; and Ic(1) and Ecs(1) were set to 5 C and 4 V, respectively, in the first step.

The above conditions are summarized in Table 1.

TABLE 1

| | Electrical resistance of sealing plate (mΩ) | First step (High-rate CC charging) | | Second Step (Low-rate CC charging) | | Third step (CV charging) | |
|---|---|---|---|---|---|---|---|
| | | Ic (1) (A) | Ecs (1) (V) | Icf (A) | Ecsf (V) | Charge voltage (V) | End-of-charge current (mA) |
| Example 1 | 1 | 2 | 3.8 | 1 | 4.2 | 4.2 | 50 |
| Example 2 | 1 | 2 | 4 | 1 | 4.2 | 4.2 | 50 |
| Example 3 | 1 | 3 | 3.8 | 1 | 4.2 | 4.2 | 50 |
| Example 4 | 1 | 5 | 3.8 | 1 | 4.2 | 4.2 | 50 |
| Example 5 | 1 | 5 | 4 | 1 | 4.2 | 4.2 | 50 |
| Example 6 | 1.5 | 5 | 4 | 1 | 4.2 | 4.2 | 50 |
| Example 7 | 2 | 5 | 4 | 1 | 4.2 | 4.2 | 50 |

Comparative Example 1

Among the above-fabricated lithium ion secondary batteries for test use, the one including a sealing plate assembly having an electrical resistance between the bottom plate and the terminal plate of 1 mΩ was used. The lithium ion secondary battery was subjected to constant-current charging at a charge current of 1 C until the charge voltage reached an end-of-charge voltage of 4.2 V. After the charge voltage reached 4.2 V, the battery was subjected to constant-voltage charging at that voltage until the end-of-charge current dropped to 50 mA.

When the charge current dropped to 50 mA, charging was stopped. Upon passage of 20 minutes thereafter, the battery was discharged at a discharge rate of 1 C, with the end-of-discharge voltage set to 2.5 V. The above charge/discharge process was regarded as one cycle, and 300 charge/discharge cycles were performed in total.

Comparative Example 2

A total of 300 charge/discharge cycles were performed in the same manner as in Comparative Example 1, except that the charge current was set to 5 C in the constant current charging.

The above conditions are summarized in Table 2.

TABLE 2

|  | Electrical resistance of sealing plate (mΩ) | Constant-current charging | | Constant-voltage charging | |
| --- | --- | --- | --- | --- | --- |
|  |  | Charge current (A) | Target voltage (V) | Charge voltage (V) | End-of-charge current (mA) |
| Comparative Example 1 | 1 | 5 | 4.2 | 4.2 | 50 |
| Comparative Example 2 | 1 | 1 | 4.2 | 4.2 | 50 |

Comparative Example 3

Among the above-fabricated lithium ion secondary batteries for test use, the one including a sealing plate assembly having an electrical resistance between the bottom plate and the terminal plate of 2.5 mΩ was used. The lithium ion secondary battery was subjected to constant-current charging at a current of 5 C (Ic(1)) until the charge voltage reached 4 V (Ecsf) (the first step). After the charge voltage reached 4 V, constant-current charging was performed at a charge current of 1 C (Icf) until the charge voltage reached 4.2 V (Ecsf) (the second step). After the charge voltage reached 4.2 V, the battery was subjected to constant-voltage charging at that voltage, with the end-of-charge current set to 50 mA (the third step).

When the charge current dropped to 50 mA, charging was stopped. Upon passage of 20 minutes thereafter, the battery was discharged at a discharge rate of 1 C, with the end-of-discharge voltage set to 2.5 V. The above charge/discharge process was regarded as one cycle, and 300 charge/discharge cycles were performed in total.

Comparative Example 4

A total of 300 charge/discharge cycles were performed in the same manner as in Comparative Example 3, except that among the above-fabricated lithium ion secondary batteries for test use, the one including a sealing plate assembly having an electrical resistance of 12 mΩ was used.

The above conditions are summarized in Table 3.

TABLE 3

|  | Electrical resistance of sealing plate (mΩ) | First step (High-rate CC charging) | | Second Step (Low-rate CC charging) | | Third step (CV charging) | |
| --- | --- | --- | --- | --- | --- | --- | --- |
|  |  | Ic (1) (A) | Ecs (1) (V) | Icf (A) | Ecsf (V) | Charge voltage (V) | End-of-charge current (mA) |
| Comparative Example 3 | 2.5 | 5 | 4 | 1 | 4.2 | 4.2 | 50 |
| Comparative Example 4 | 12 | 5 | 4 | 1 | 4.2 | 4.2 | 50 |

The initial charging time (the charging time at the 1st cycle) and the capacity retention rate (=(discharge capacity at the 300th cycle/discharge capacity at the 1st cycle)×100) in Examples 1 to 7 and Comparative Examples 1 to 4 are shown in Table 4.

TABLE 4

|  | Initial charging time (min) | Capacity retention rate (%) |
| --- | --- | --- |
| Example 1 | 60 | 80 |
| Example 2 | 55 | 78 |
| Example 3 | 43 | 76 |
| Example 4 | 36 | 72 |
| Example 5 | 30 | 66 |
| Example 6 | 34 | 66 |
| Example 7 | 40 | 60 |
| Comparative Example 1 | 20 | 30 |
| Comparative Example 2 | 73 | 80 |
| Comparative Example 3 | 45 | 50 |
| Comparative Example 4 | Charging impossible | — |

In Examples 1 to 7, the initial charging time was within 60 minutes, and the capacity retention rate was 60% or more. In contrast, in Comparative Example 1 in which charging was performed at a high rate of 5 C to the end-of-charge voltage, the initial charging time was short (20 min), whereas the capacity retention rate was significantly reduced (30%). On the other hand, in Comparative Example 2 in which charging was performed at a comparatively low rate of 1 C to the end-of-charge voltage, the capacity retention rate was high (80%), whereas the initial charging time far exceeded one hour (73 min). The above results show that shortening the charging time while suppressing deterioration of the secondary battery is realized in Examples 1 to 7.

Comparison between Example 7 and Comparative Example 3 show that by suppressing the electrical resistance of the sealing plate assembly as low as 2 mΩ or less, the deterioration in cycle characteristics can be suppressed. Example 7 differs from Comparative Example 3 in terms of the electrical resistance of the sealing plate and the target voltage Ecs(1) for high-rate charging. In Example 7 in which the electrical resistance of the sealing plate was 2 mΩ, the capacity retention rate at the 300th cycle was 60%. In contrast, in Comparative Example 3 in which the electrical resistance of the sealing plate was 2.5 mΩ, the capacity retention rate was dropped to 50%. This is presumably because, in Comparative Example 3, the polarization voltage was increased, and the actual charge voltage became larger than that of Example 7, which resulted in deteriorated cycle characteristics.

Here, in Comparative Example 4 in which the electrical resistance of the sealing plate was 12 mΩ, charging was impossible because the internal resistance of the secondary battery was too high, failing to obtain a charge current of 5 C when the target voltage was set to 4 V.

Comparison among Examples 1 to 7 shows that there is a tendency that the higher the current Ic(1) in the first step was, the shorter the charging time was. Conversely, there is a tendency that the lower the current Ic(1) in the first step was, the higher the capacity retention rate was. Comparison between Example 1 and Example 2 and comparison between Example 4 and Example 5 show that the lower the target voltage at which high-rate charging was switched to low-rate charging (i.e., the target voltage in the first step) was, the longer the charging time was. On the other hand, the charge/discharge cycle life characteristics were improved.

The current Ic(1) in the first step in Example 7 was the same as that in Example 6. Regardless of this, the charging time in Example 7 was longer than in Example 6, presumably because the electrical resistance of the sealing plate in Example 7 was higher than that in Example 6, causing a larger increase in polarization voltage. As a result, the actually charged voltage at a high rate of 5 C in Example 7 was smaller than that in Example 6, when compared in terms of, for example, the open-circuit voltage.

As shown above, in Examples 1 to 7 employing a constant-current charging method in which high-rate charging was performed while the depth of charging was small, and then the charge current was lowered to perform low-rate charging, it was possible to achieve a shorter charging time as well as an improved charge/discharge cycle life characteristics.

Example 8

Six test batteries fabricated as above were electrically connected into a 2-in-parallel by 3-in-series battery group. The battery group was provided with a battery management unit (BMU), to form a battery pack.

The battery pack formed in the above was subjected to constant-current charging at 5 C until the charge voltage reached a target voltage of 12 V (the first step). After the first step, the battery pack was subjected to constant-current charging at 1 C until the charge voltage reached an end-of-charge voltage of 12.6 V (the second step). After the second step, the battery pack was subjected to constant-voltage charging at the above end-of-charge voltage until the charge current dropped to an end-of-charge current of 100 mA (50 mA per one battery) (the third step).

Upon passage of 20 minutes after the third step, the battery pack was discharged at 1 C, with the end-of-discharge voltage set to 7.5 V (2.5 V per one battery). The above charge/discharge process was regarded as one cycle, and 300 charge/discharge cycles were performed in total.

Example 9

The charge current in the first step was corrected after every one charge/discharge cycle according to the percentage of deterioration of the battery, for example, the percentage of reduction in discharge capacity, by using the cycle count function of the BMU provided in the battery pack. The percentage of reduction in discharge capacity in Example 8 was about 0.1% ($\approx$(100−68)/300), and in this example, this reduction percentage was employed. More specifically, the charge current at the $n^{th}$ cycle, where n is an integer of two or more, in the first step was calculated by multiplying the charge current at the $(n-1)^{th}$ cycle by 0.998. A total of 300 charge/discharge cycles were performed in the same manner as in Example 8, except the above.

Example 10

The charge current in the first step was lowered by 180 mA (90 (=1800×0.001×50) mA per one battery) after every 50 charge/discharge cycles, on the basis of the percentage of reduction in discharge capacity in Example 8 (0.2%). A total of 300 charge/discharge cycles were performed in the same manner as in Example 8, except the above.

With respect to Examples 8 to 10, the initial charging time, the charging time at the 300th cycle, and the capacity retention rate were measured. The results are summarized in Table 5.

TABLE 5

|  | Initial charging time (min) | Charting time at 300th cycle (min) | Capacity retention rate (%) |
| --- | --- | --- | --- |
| Example 8 | 30 | 33 | 68 |
| Example 9 | 30 | 31 | 72 |
| Example 10 | 30 | 31 | 72 |

In Examples 9 and 10 in which the charge current was lowered according to the percentage of reduction in discharge capacity, the charging time at the 300th cycle was longer than that in Example 8 in which the charge current was kept constant regardless of any reduction in discharge capacity. The capacity retention rate in Example 8 was slightly inferior to that in Example 9 or 10.

The foregoing results show that by lowering the charge current with increase in the number of cycles, the charging time can be more effectively shortened, and at the same time, the deterioration in cycle characteristics can be more effectively suppressed.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

Industrial Applicability

The lithium ion secondary battery which employs the charging method and charging/discharging method according to the present invention is suitably applicable as a power source for electronic equipment such as mobile devices and information devices.

Reference Signs List

10 Battery pack
12 Secondary battery
16 Voltage detector
17 Current detector
18 Controller
34 Sealing plate assembly

The invention claimed is:
1. A method for charging a lithium ion secondary battery which comprises: a power generation element including a positive electrode, a negative electrode, a separator interposed between the positive electrode and the negative electrode, and a non-aqueous electrolyte; a case accommodating the power generation element and having an opening; and a sealing plate sealing the opening of the case,
the sealing plate having an external terminal of the positive electrode or the negative electrode, and an internal terminal electrically connected to the positive electrode or the negative electrode, the internal terminal and the external terminal being connected to each other and having an electrical resistance therebetween of 0.1 to 2 mΩ,
the charging method comprising:
(i) two or more constant-current charging steps in each of which the secondary battery is charged at a constant charge current and which are performed until a charge voltage reaches an end-of-charge voltage Ecsf; and

(ii) a constant-voltage charging step which is performed after the charge voltage has reached the end-of-charge voltage Ecsf and in which the secondary battery is charged at the end-of-charge voltage Ecsf until a charge current drops to a predetermined current, the two or more constant-current charging steps including:

(a) a constant-current charging in which the secondary battery is charged at a current Ic(1) of 1 to 5 C until the charge voltage reaches a target voltage Ecs(1) satisfying Ecs(1)<Ecsf; and (b) a constant-current charging which is performed after the charge voltage has reached the target voltage Ecs(1) and in which the secondary battery is charged at a current Ic(k) satisfying Ic(k)≤Ic(1) until the charge voltage reaches a target voltage Ecs(k) higher than the target voltage Ecs(1), the target voltage Ecs(k) satisfying Ecs(k)≤Ecsf.

2. The method for charging a lithium ion secondary battery in accordance with claim 1, wherein a ratio of the current Ic(k) to Ic(1) is 0.1 to 0.7.

3. The method for charging a lithium ion secondary battery in accordance with claim 1, wherein a difference ΔV between the target voltages Ecs(k) and Ecs(1) is 0.05 to 0.2 V.

4. The method for charging a lithium ion secondary battery in accordance with claim 1, wherein the positive electrode includes a material represented by the general formula: $LiNi_xCo_yM_{1-x-y}O_2$, where M is at least one element selected from the group consisting of Group 2 elements, Group 3 elements, Group 4 elements, Group 7 elements, and Group 13 elements in the long-form periodic table, 0.3≤x<1, and 0<y<0.4.

5. The method for charging a lithium ion secondary battery in accordance with claim 1, wherein the target voltage Ecs(1) is 3.8 to 4 V.

6. The method for charging a lithium ion secondary battery in accordance with claim 1, wherein the target voltage Ecs(k) is 4 to 4.2 V.

7. The method for charging a lithium ion secondary battery in accordance with claim 1, wherein a frequency of use of the secondary battery is detected, and on the basis of the detected frequency of use, the current Ic(1) is corrected such that the higher the frequency of use is, the lower the current Ic(1) is.

8. A battery pack comprising: at least one lithium ion secondary battery which includes a power generation element, a case accommodating the power generation element and having an opening, and a sealing plate sealing the opening of the case, the power generation element including a positive electrode, a negative electrode, a separator interposed between the positive electrode and the negative electrode, and a non-aqueous electrolyte; and a controller for controlling charging of the lithium ion secondary battery, the sealing plate having an external terminal of the positive electrode or the negative electrode, and an internal terminal electrically connected to the positive electrode or the negative electrode, the internal terminal and the external terminal being connected to each other and having an electrical resistance therebetween of 0.1 to 2 mΩ, wherein the controller performs:

(i) two or more constant-current charging steps in each of which the secondary battery is charged at a constant charge current and which are performed until a charge voltage reaches an end-of-charge voltage Ecsf; and (ii) a constant-voltage charging step which is performed after the charge voltage has reached the end-of-charge voltage Ecsf and in which the secondary battery is charged at the end-of-charge voltage Ecsf until a charge current drops to a predetermined current, the two or more constant-current charging steps including:

(a) a constant-current charging in which the secondary battery is charged at a current Ic(1) of 1 to 5 C until the charge voltage reaches a target voltage Ecs(1) satisfying Ecs(1)<Ecsf; and (b) a constant-current charging which is performed after the charge voltage has reached the target voltage Ecs(1) and in which the secondary battery is charged at a current Ic(k) satisfying Ic(k)≤Ic(1) until the charge voltage reaches a target voltage Ecs(k) higher than the target voltage Ecs(1), the target voltage Ecs(k) satisfying Ecs(k)≤Ecsf.

9. The battery pack in accordance with claim 8 further comprising a counter for counting the number of charging times of the secondary battery, wherein on the basis of the number of charging times, the controller corrects the current Ic(1) such that the larger the number of charging times is, the lower the current Ic(1) is.

10. The battery pack in accordance with claim 8, wherein a fuse is interposed between the internal terminal and the external terminal.

* * * * *